United States Patent
Hong et al.

(10) Patent No.: US 6,917,127 B2
(45) Date of Patent: Jul. 12, 2005

(54) OUTER STATOR FOR LINEAR COMPRESSOR MOTORS

(75) Inventors: Eon Pyo Hong, Seoul (KR); Kyeong Bae Park, Seoul (KR); Tae Hee Kwak, Inchun-si (KR); Ki Chul Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/855,495

(22) Filed: May 28, 2004

(65) Prior Publication Data

US 2004/0245863 A1 Dec. 9, 2004

(30) Foreign Application Priority Data

Jun. 4, 2003 (KR) .............................. 10-2003-0035931

(51) Int. Cl.[7] .............................................. H02K 41/00
(52) U.S. Cl. ........................................ 310/14; 310/164
(58) Field of Search ............................ 310/12–37, 164; 417/416, 417

(56) References Cited

U.S. PATENT DOCUMENTS

| | | | | |
|---|---|---|---|---|
| 4,265,530 A | * | 5/1981 | Petersen | 396/256 |
| 4,299,544 A | * | 11/1981 | Masaka | 417/417 |
| 4,895,495 A | * | 1/1990 | Arai | 417/360 |
| 5,300,844 A | * | 4/1994 | Schuler | 310/215 |
| 5,739,599 A | * | 4/1998 | Murai | 310/14 |
| 6,077,054 A | * | 6/2000 | Lee et al. | 417/417 |
| 2004/0245862 A1 | | 12/2004 | Hong et al. | 310/12 |

* cited by examiner

Primary Examiner—Dang Le
(74) Attorney, Agent, or Firm—Greenblum & Bernstein, P.L.C.

(57) ABSTRACT

An outer stator of a motor is mounted in a linear compressor for compressing a coolant gas. The outer stator comprises a coil assembly having a coil wound on a bobbin with flange parts and a plurality of core blocks that surround the coil assembly. The flange parts of the bobbin are provided with bobbin pressers that include protrusions so that the core blocks and the bobbin are pressed by a cylinder block and a back cover mounted in the linear compressor when the outer stator is in the linear compressor. The core blocks and the coil assembly of the outer stator are assembled in the linear compressor while the core blocks and the coil assembly of the outer stator are integrally attached to each other. Consequently, relative movement between the coil assembly and the core blocks is effectively prevented when the linear compressor is operated. Furthermore, shifting of coil wound on the bobbin is effectively prevented.

16 Claims, 5 Drawing Sheets

OUTER STATOR FOR LINEAR COMPRESSOR MOTORS

BACKGROUND OF THE INVENTION

1. Field of the Invention

The present invention relates to a motor for linear compressors that is capable of generating a driving force, by means of which a piston is linearly reciprocated in a cylinder, and more particularly to an outer stator for such linear compressor motors wherein a coil assembly of the outer stator and core blocks of the outer stator, which together constitute the motor, are integrated, whereby the outer stator is securely and reliably assembled in the linear compressor.

2. Description of the Related Art

Generally, a linear compressor is constructed such that a linear driving force from a motor is transmitted to a piston, which is linearly reciprocated in a cylinder, whereby a coolant gas is introduced, compressed, and discharged.

FIG. 1 is a cross-sectional view showing a conventional linear compressor, FIG. 2 is a perspective view showing an outer stator for linear compressor motors according to the prior art, and FIG. 3 is a cross-sectional view taken along the line A—A of FIG. 2.

As shown in FIG. 1, the conventional linear compressor comprises: a hermetically sealed container 1; a cylinder block 4 and a back cover 5 mounted in the hermetically sealed container 1 such that shock applied to the cylinder block 4 is absorbed by means of a damper 2 and shock applied to the back cover 5 is absorbed by means of another damper 3; a cylinder 6 fixedly attached to the cylinder block 4; a piston 7 disposed in the cylinder 6 such that the piston 7 is linearly reciprocated in the cylinder 6; a magnet frame 8 fixed to the piston 7; and a motor M for linearly moving the piston 7.

The motor M comprises: an outer stator 10 dispose between the cylinder block 4 and the back cover 5; an inner stator 20 disposed inside the outer stator 10 while being spaced apart from the outer stator 10; and a magnet 30 disposed between the outer stator 10 and the inner stator 20. The magnet 30 is fixed to the magnet frame 8.

The outer stator 10 comprises: a coil assembly 13 comprising a bobbin 11 and a coil 12 wound on the bobbin; and left-side and right-side core blocks 14 each made of a plurality of laminated steel plates and assembled with the coil assembly 13 such that the core blocks 14 surround the coil assembly 13. The core blocks 14 are arranged in large numbers while being spaced apart from each other by a prescribed distance in the radial direction on the bobbin 11.

In the linear compressor with the above-stated construction, an electro-magnetic field generated between the outer stator 10 and the inner stator 20 is varied when alternating current is applied to the coil 12 of the outer stator 10. As a result, the magnet 30 is linearly reciprocated, and thus the magnet frame 8 and the piston 7 are also linearly reciprocated. Consequently, a coolant gas is introduced into a compression chamber C through an inlet pipe 41 and an inlet channel 42, and is then compressed. The compressed coolant gas is discharged to the outside through an outlet pipe 43.

The structure and production process of the outer stator 10 of the motor M will now be described in more detail with reference to FIGS. 2 and 3.

On the bobbin 11 with flange parts 11a formed at both sides thereof while being extended in the radial direction is wound the coil 12 so that the coil assembly 13 is prepared. The core blocks 14, each of which is made of a plurality of laminated steel plates, are arranged in large numbers while being spaced apart from each other in the radial direction so that the core blocks 14 surround the coil assembly 13.

While the coil assembly 13 is assembled with the core blocks 14, the coil assembly 13 and the core blocks 14 are put in an over mold (not shown), and a synthetic resin is injected into the over mold so that an insulating layer 16 is formed between the coil 12 of the coil assembly and the core blocks 14, and over mold layer 17 on the outer circumferences of the coil assembly 13 and the left-side and right-side core blocks 14. After the outer stator 10 is manufactured as described above, the outer stator 10 is disposed between the cylinder block 4 and the back cover 5, as shown in FIG. 1, and the outer surfaces of the core blocks 14 are pressed against the cylinder block 4 and the back cover 5 by means of a plurality of bolt and nut assemblies 9. Finally, the outer stator 10 is assembled in the linear compressor.

In the outer stator 10 for linear compressor motors according to the prior art, a high-temperature synthetic resin is injected so that the over mold layer 17 is formed, which is required to integrally fix the core blocks 14 and the coil assembly 13 to each other. Consequently, the core blocks 14 may be thermally deformed, by which design dimensions are changed. Furthermore, the over mold and the synthetic resin are necessary, which increases the production cost of the outer stator 10 of linear compressor motors.

Only the core blocks 14 of the outer stator 10 are pressed between the cylinder block 4 and the back cover 5 by means of the bolt and nut assemblies 9, which are then assembled in the linear compressor. Consequently, there may occur relative movement between the bobbin 11 and the core blocks 14 or the coil 12 wound on the bobbin may be slightly shifted due to vibration or shock generated when the linear compressor is operated or due to inferiority of the over mold layer 17.

SUMMARY OF THE INVENTION

Therefore, the present invention has been made in view of the above problems, and it is an object of the present invention to provide an outer stator of linear compressor motors including a coil assembly and core blocks wherein the coil assembly and the core blocks are integrally assembled in the compressor while no over mold layer is formed on the coil assembly and the core blocks, whereby the production cost of the outer stator is reduced, thermal deformation of the core blocks is prevented so that accurate design dimensions of the core blocks are guaranteed.

It is another object of the present invention to provide an outer stator for linear compressor motors that is capable of preventing relative movement between the coil assembly and the core blocks when the linear compressor is operated.

It is yet another object of the present invention to provide an outer stator for linear compressor motors that is capable of preventing shift of a coil wound on a bobbin of the coil assembly.

In accordance with the present invention, the above and other objects can be accomplished by the provision of an outer stator for linear compressor motors, comprising: a coil assembly comprising a bobbin and a coil wound on the bobbin; and a plurality of core blocks disposed on the coil assembly while being spaced apart from each other by a prescribed distance such that the core blocks surround the coil assembly, wherein the outer stator further comprises bobbin pressing means for pressing the bobbin when the outer stator is assembled in the linear compressor.

Preferably, the bobbin pressing means are protrusions formed at one or two of the flange parts formed at both sides of the bobbin such that the protrusions are extended toward the outsides of the flange parts in the longitudinal direction of the bobbin.

Preferably, the protrusions are extended up to the outer surfaces of the core blocks, or the protrusions are extended outward farther than the outer surfaces of the core blocks.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
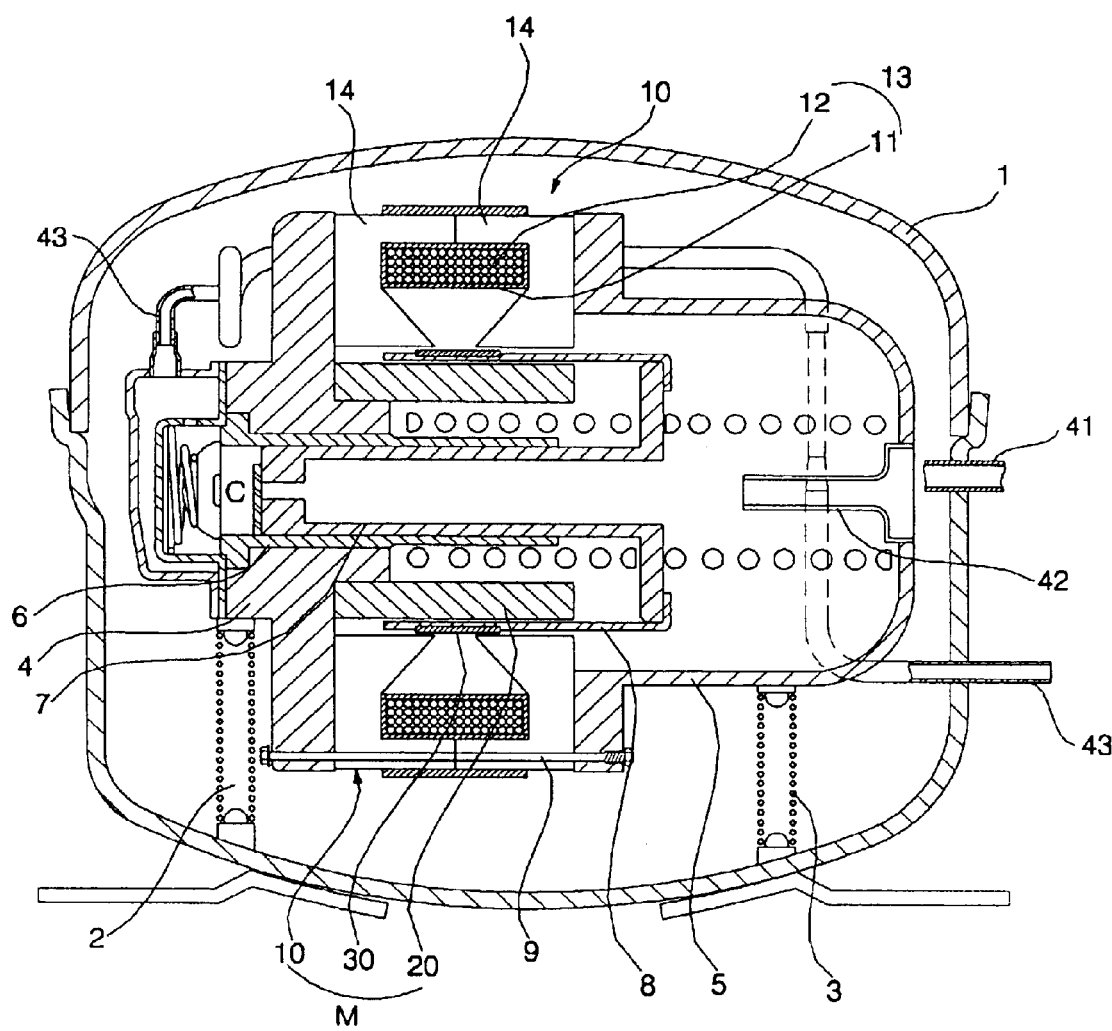
FIG. 1 is a cross-sectional view showing a conventional linear compressor.
Figure 2:
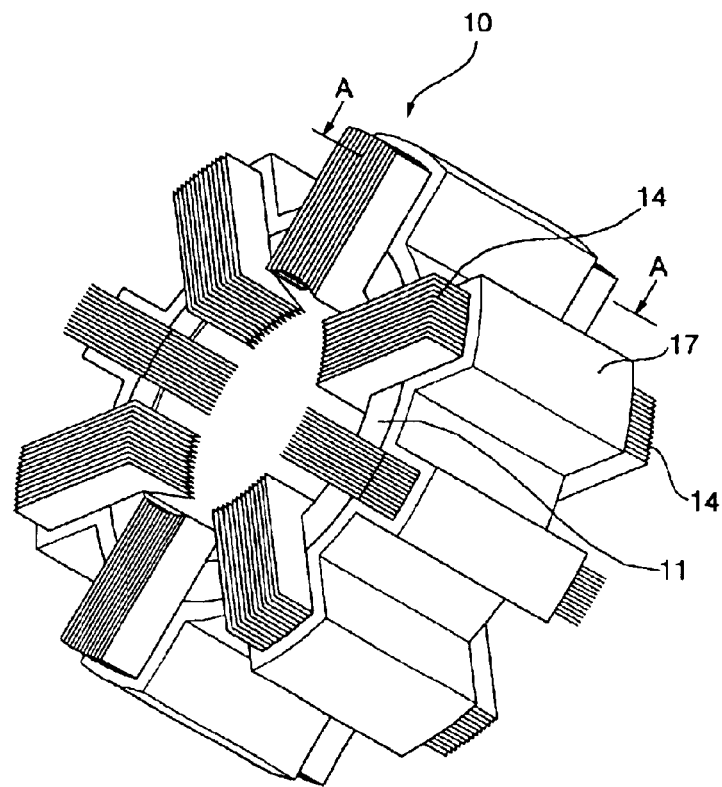
FIG. 2 is a perspective view showing an outer stator for linear compressor motors according to the prior art.
Figure 3:
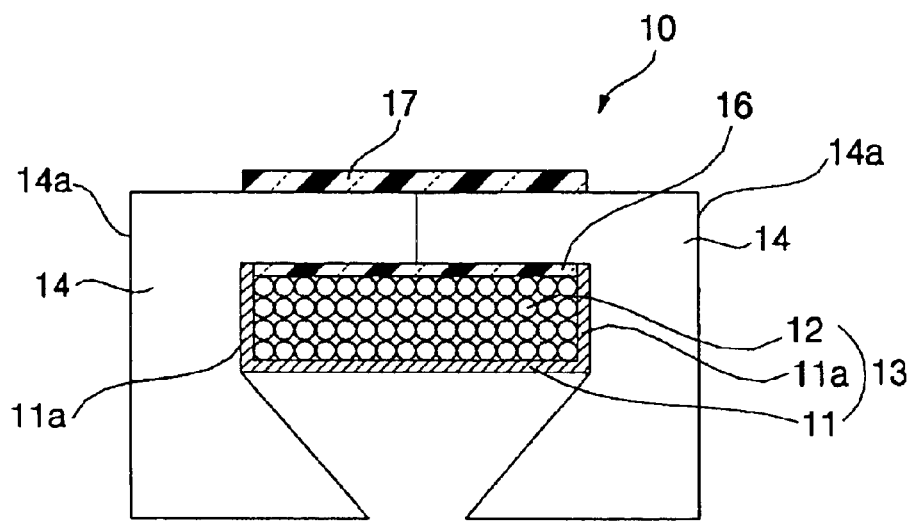
FIG. 3 is a cross-sectional view taken along the line A—A of FIG. 2.
Figure 4:
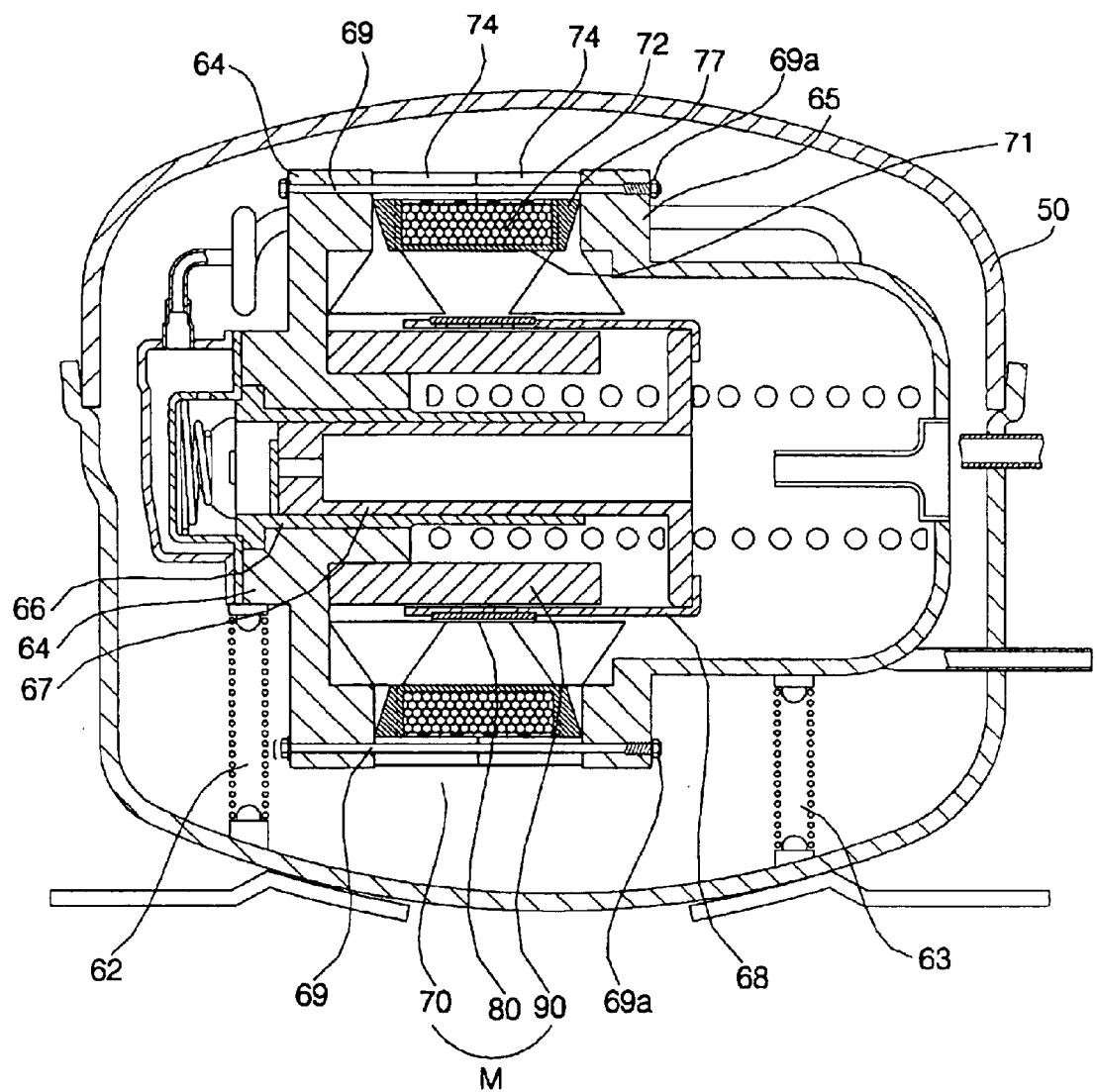
FIG. 4 is a cross-sectional view showing a linear compressor equipped with an outer stator according to a preferred embodiment of the present invention.
Figure 5:
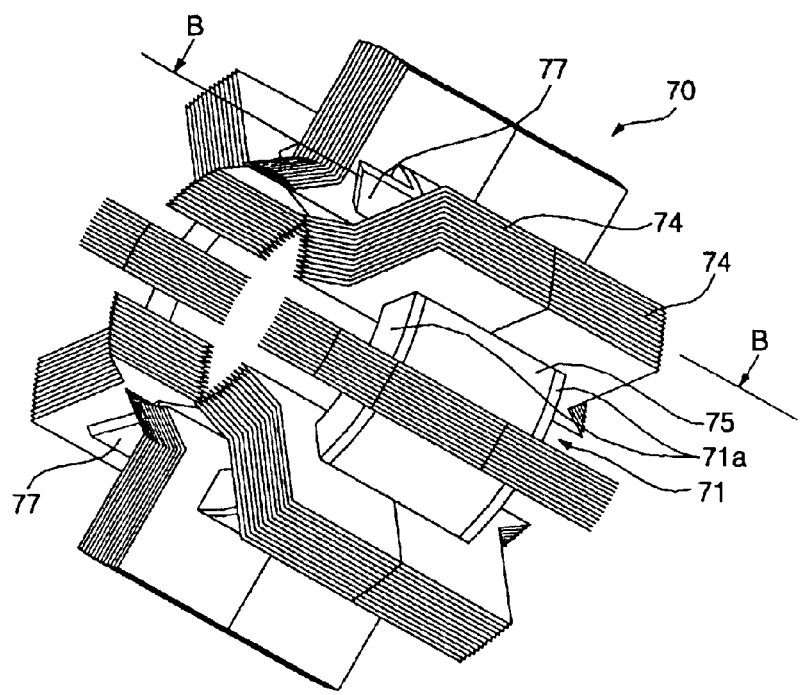
FIG. 5 is a perspective view showing the outer stator for linear compressor motors according to the preferred embodiment of the present invention.
Figure 6:
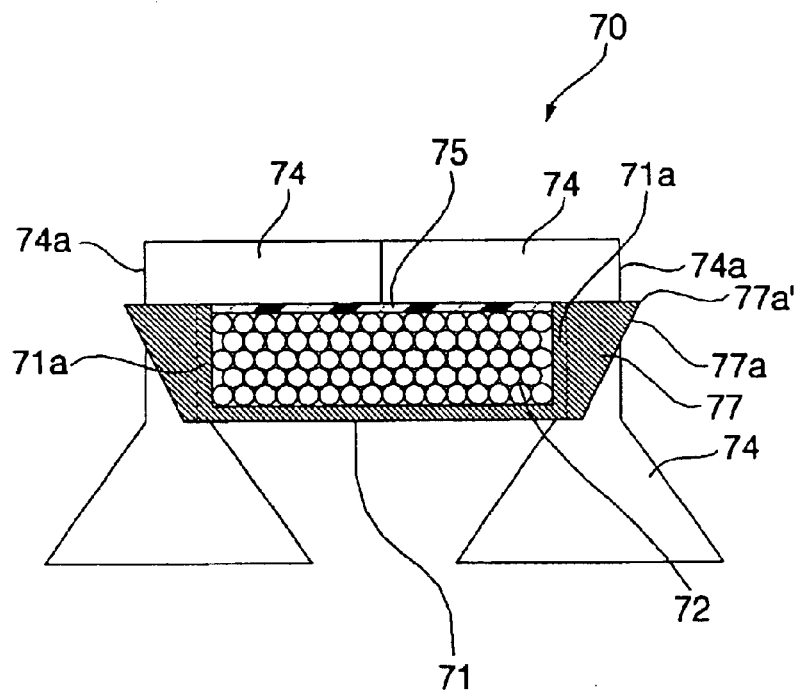
FIG. 6 is a cross-sectional view taken along the line B—B of FIG. 5.
Figure 7:
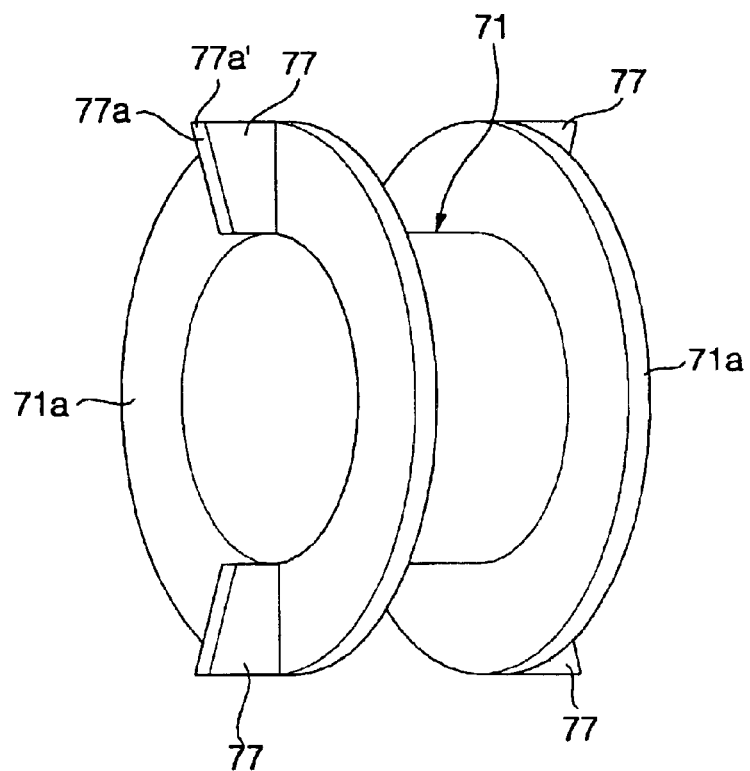
FIG. 7 is a perspective view showing a bobbin of the outer stator for linear compressor motors according to the preferred embodiment of the present invention.

FIG. 4 is a cross-sectional view showing a linear compressor equipped with an outer stator according to a preferred embodiment of the present invention, FIG. 5 is a perspective view showing the outer stator for linear compressor motors according to the preferred embodiment of the present invention, FIG. 6 is a cross-sectional view taken along the line B—B of FIG. 5, and FIG. 7 is a perspective view showing a bobbin of the outer stator for linear compressor motors according to the preferred embodiment of the present invention.

As shown in FIG. 4, the conventional linear compressor comprises: a hermetically sealed container 50; a cylinder block 64 and a back cover 65 mounted in the hermetically sealed container 50 such that shock applied to the cylinder block 44 is absorbed by means of a damper 62 and shock applied to the back cover 65 is absorbed by means of another damper 63; a cylinder 66 fixedly attached to the cylinder block 64; a piston 67 disposed in the cylinder 66 such that the piston 67 is linearly reciprocated in the cylinder 66; a magnet frame 68 fixed to the piston 67; and a motor M for linearly moving the piston 67.

The motor M comprises: an outer stator 70 disposed between the cylinder block 64 and the back cover 65 while being fixedly attached to the cylinder block 64 and the back cover 65 by means of a plurality of bolt and nut assemblies 69 and 69a; an inner stator 90 disposed inside the outer stator 70; and a magnet 80 disposed between the outer stator 70 and the inner stator 90. The magnet 80 is fixed to the magnet frame 68.

As shown in FIGS. 5, 6 and 7, the outer stator 70 comprises: a coil assembly comprising a bobbin 71 having left-side and right-side flange parts 71a formed at both sides thereof, a coil 72 wound on the bobbin 71, and an insulating member 75 formed on the coil 72 wound on the bobbin 71; and a plurality of left-side and right-side core blocks 74 each made of a plurality of laminated steel plates and disposed on the coil assembly while being spaced apart from each other in the radial direction such that the core blocks 74 surround the coil assembly.

The outer stator 70 is provided with bobbin pressing means for pressing the bobbin in the axial direction by means of the cylinder block 64 and the back cover 65 as the nuts 69a are tightened on the ends of the bolts 69, which are inserted through holes formed at the cylinder block 64 and the back cover 65 after the outer stator 70 is disposed between the cylinder block 64 and the back cover 65.

The bobbin pressing means is composed of protrusions 77 formed at the left-side and right-side flange parts 71a, respectively, while being extended toward the outsides of the flange parts 71a in the longitudinal direction of the bobbin 71.

The protrusions 77 are disposed opposite to each other in the radial direction of the flange parts 71a while being spaced apart from each other by an angle of 180 degrees about the axis of the bobbin 71.

The outer surfaces 77a of the protrusions 77 are inclined in the radial direction of the flange parts 71a such that the ends 77a' of the outer surfaces 77a of the protrusions 77 farthest from the center of the bobbin 71 are extended outwardly to the maximum.

As shown in FIG. 6, the ends 77a' of the protrusions 77 are preferably extended outward in the longitudinal direction of the bobbin 71 slightly farther than the outer surfaces 74a of the core blocks 74, although the ends 77a' of the protrusions 77 may be extended up to the outer surfaces 74a of the core blocks 74.

Manufacturing and assembling processes of the outer stator with the above-stated construction will now be described.

The bobbin 71 having the left-side and right-side flange parts 71, from which the protrusions 77 are extended outward, is prepared. After the coil 72 is wound on the bobbin 71, a synthetic resin is injected onto the coil 72 wound on the bobbin 71. In this way, the coil assembly is prepared.

A plurality of steel plates are laminated and then welded so that the core blocks 74 are prepared. The prepared core blocks 74 are disposed on the coil assembly while being spaced apart from each other in the radial direction such that the core blocks 74 surround the coil assembly. In this way, the outer stator 70 is prepared.

After the prepared outer stator 70 is disposed between the cylinder block 64 and the back cover 65 as shown in FIG. 4, the bolts 69 are inserted through the holes formed at the cylinder block 64 and the back cover 65, and then the nuts 69a are tightened on the ends of the bolts 69, by which the outer stator 70 is fixedly disposed between the cylinder block 64 and the back cover 65 by means of the cylinder block 64 and the back cover 65.

At this time, the ends 77a' of the protrusions 77 of the outer stator 70 are pressed by means of the cylinder block 64 and the back cover 65 with the result that the left-side and right-side flange parts 71a are bent inward such that the left-side and right-side flange parts 71a become closer to each other. Consequently, the bobbin 71 is securely fixed to the cylinder block 64 and the back cover 65, and thus the coil 72 wound on the bobbin 71 between the left-side and right-side flange parts 71a is pressed, whereby shift of the coil 72 on the bobbin 71 is effectively prevented.

When the ends 77a' of the protrusions 77 are pressed up to the outer surfaces 74a of the core blocks 74 by means of the cylinder block 64 and the back cover 65, the cylinder block 64 and the back cover 65 make contact with the outer surfaces 74a of the core blocks 74 with the result that the core blocks 74 are pressed. Consequently, the core blocks 74 are tightly attached to the coil assembly between the cylinder block 64 and the back cover 65.

Figure 8:
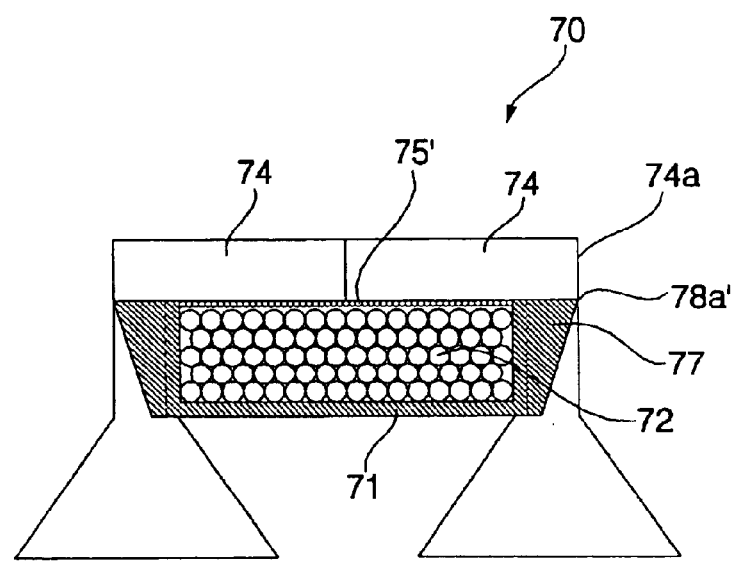
FIG. 8 is a cross-sectional view showing an outer stator for linear compressor motors according to another preferred embodiment of the present invention.

FIG. 8 is a cross-sectional view showing an outer stator for linear compressor motors according to another preferred embodiment of the present invention.

In the outer stator as shown in FIG. 8, an insulating member 75' formed in the shape of a thread is wound on the coil 72, and the ends 78a' of the protrusions 77 are extended outward up to the outer surfaces of the core blocks 74.

Other constructions of the outer stator as shown in FIG. 8 are identical to those of the outer stator as shown in FIG. 6, and a detailed description thereof will not be given accordingly.

As apparent from the above description, the present invention provides an outer stator of a motor mounted in a linear compressor for compressing a coolant gas, the outer stator comprising a coil assembly having a coil wound on a bobbin with flange parts formed at both sides thereof, and a plurality of core blocks disposed such that the coil assembly is surrounded by the core blocks, wherein the flange parts of the bobbin are provided with bobbin pressing means, i.e., protrusions so that not only the core blocks but also the bobbin are pressed by means of a cylinder block and a back cover mounted in the linear compressor when the outer stator is assembled in the linear compressor, whereby the core blocks and the coil assembly of the outer stator are assembled in the linear compressor while the core blocks and the coil assembly of the outer stator are integrally attached to each other. Consequently, relative movement between the coil assembly and the core blocks is effectively prevented when the linear compressor is operated. Furthermore, shifting of coil wound on the bobbin is effectively prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An outer stator for a linear compressor motor, comprising:

a coil assembly comprising a bobbin having flanges on end portions thereof, and a coil wound on the bobbin;

a plurality of core blocks disposed on the coil assembly and spaced such that the core blocks surround the coil assembly; and bobbin pressers configured to press the flanges of the bobbin in a longitudinal direction of the bobbin when the outer stator is positioned between a cylinder block and a back cover of the linear compressor.

2. The stator as set forth in claim 1, wherein the bobbin pressers comprise protrusions on at least one of the flanges of end portions of the bobbin.

3. The stator as set forth in claim 2, wherein the protrusions extend along the outer portion of the flanges in the longitudinal direction of the bobbin.

4. The stator as set forth in claim 3, wherein the protrusions are spaced along a perimeter of the bobbin by an angle of 180 degrees.

5. The stator as set forth in claim 3, wherein the protrusions are positioned along a radial direction of the flanges.

6. The stator as set forth in claim 3, wherein the outer surfaces of the protrusions comprise an inclined portion that extends in a radial direction of the flanges.

7. The stator as set forth in claim 6, wherein radially outermost ends of the protrusions extend farthest from the center of the bobbin.

8. The stator as set forth in claim 3, wherein the protrusions extend to the outer surface of the core blocks.

9. The stator as set forth in claim 3, wherein the protrusions extend beyond the outer surfaces of the core blocks.

10. The stator as set forth in claim 1, wherein the core blocks and the bobbin are disposed between the cylinder block and the back cover of the linear compressor by fastening members such that the core blocks and the bobbin are pressed against the cylinder block and the back cover.

11. The stator as set forth in claim 10, wherein the fastening members comprise bolt and nut assemblies.

12. The stator as set forth in claim 1, further comprising an insulating member between the coil and the core blocks.

13. The stator as set forth in claim 12, wherein the insulating member comprises a synthetic resin coating on the coil.

14. The stator as set forth in claim 12, wherein the insulating member comprises a thread wound on the coil.

15. The stator according to claim 1, wherein each of the bobbin pressers extend transversely to a surface of a corresponding flange.

16. The stator according to claim 1, wherein the bobbin pressers bear against the cylinder block and the back cover of the linear compressor.

* * * * *